United States Patent
Dardona et al.

(10) Patent No.: US 10,480,345 B2
(45) Date of Patent: Nov. 19, 2019

(54) WEAR INDICATION SENSOR DESIGNS AND METHODS OF INTEGRATION

(71) Applicant: United Technologies Corporation, Farmington, CT (US)

(72) Inventors: Sameh Dardona, South Windsor, CT (US); Dustin D. Caldwell, Portland, CT (US); Paul Sheedy, Bolton, CT (US); Thomas D. Kasprow, Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 245 days.

(21) Appl. No.: 15/652,837

(22) Filed: Jul. 18, 2017

(65) Prior Publication Data

US 2019/0024532 A1   Jan. 24, 2019

(51) Int. Cl.
| | |
|---|---|
| *F01D 21/00* | (2006.01) |
| *F01D 5/12* | (2006.01) |
| *F01D 11/12* | (2006.01) |
| *G01B 7/14* | (2006.01) |

(52) U.S. Cl.
CPC ............ *F01D 21/003* (2013.01); *F01D 5/12* (2013.01); *F01D 11/122* (2013.01); *G01B 7/14* (2013.01); *F05D 2220/32* (2013.01)

(58) Field of Classification Search
CPC ........ F01D 21/003; F01D 11/122; F01D 5/12; F05D 2260/80; F05D 2220/32; G01B 7/14
USPC .. 324/600, 699, 200, 207.13, 219, 239–247, 324/500, 529, 530, 177, 179, 378, 220, 324/750.16, 717, 758; 416/233; 29/889.7
See application file for complete search history.

(56) References Cited

U.S. PATENT DOCUMENTS

| | | | |
|---|---|---|---|
| 6,717,420 B2 | 4/2004 | Eyraud et al. | |
| 8,151,623 B2 | 4/2012 | Shinde et al. | |
| 8,482,306 B2 | 7/2013 | Andarawis et al. | |

(Continued)

FOREIGN PATENT DOCUMENTS

WO    2010030308 A1    3/2010

OTHER PUBLICATIONS

The Extended European Search Report for Application No. 18184316.0-1006; Report dated Oct. 29, 2018; Report Received Date: Jan. 8, 2019; 9 pages.

*Primary Examiner* — Melissa J Koval
*Assistant Examiner* — Trung Nguyen
(74) *Attorney, Agent, or Firm* — Cantor Colburn LLP

(57) ABSTRACT

In combination a wear indication sensor and a component of a gas turbine engine is provided. The wear indication sensor is secured to a first surface of the component of the gas turbine engine. The wear indication sensor comprises: a first terminal; a second terminal electrically connected to the first terminal; two or more of resistors electrically connecting the first terminal to the second terminal, each of the two or more resistors including a first end electrically connected to the first terminal and a second end electrically connected to the second terminal, wherein each of the two or more resistors has a known resistance; and a first electrode electrically connecting the first terminal to the first end of each of the two or more resistors; wherein the first end of each of the two or more resistors is electrically connected to the first electrode through primary conductive lines.

17 Claims, 8 Drawing Sheets

(56) References Cited

U.S. PATENT DOCUMENTS

| | | | |
|---|---|---|---|
| 2005/0158511 A1 | 7/2005 | Sabol et al. | |
| 2009/0243585 A1* | 10/2009 | Andarawis | G01N 27/041 324/71.2 |
| 2014/0326058 A1* | 11/2014 | Broughton | G01M 15/14 73/112.01 |
| 2015/0032330 A1 | 1/2015 | Sakoda et al. | |

* cited by examiner

WEAR INDICATION SENSOR DESIGNS AND METHODS OF INTEGRATION

BACKGROUND

The subject matter disclosed herein generally relates to gas turbine engines and, more particularly, to a method and an apparatus for detecting blade tip clearance for a gas turbine engine.

Gas turbine engines are used in numerous applications, one of which is for providing thrust to an airplane. Gas turbines comprise a number of blades in different sections that rotate in order to generate thrust. In order to improve performance, designers have reduced the clearance between blades and inner surfaces of the gas turbine engine. This reduced clearance leads to less room for blade rotation and thus the blade clearance must be accurately monitored.

SUMMARY

According to one embodiment, in combination a wear indication sensor and a component of a gas turbine engine is provided. The wear indication sensor is secured to a first surface of the component of the gas turbine engine. The wear indication sensor comprising: a first terminal; a second terminal electrically connected to the first terminal; two or more of resistors electrically connecting the first terminal to the second terminal, each of the two or more resistors including a first end electrically connected to the first terminal and a second end electrically connected to the second terminal, wherein each of the two or more resistors has a known resistance; and a first electrode electrically connecting the first terminal to the first end of each of the two or more resistors; wherein the first end of each of the two or more resistors is electrically connected to the first electrode through primary conductive lines.

In addition to one or more of the features described above, or as an alternative, further embodiments may include that the two or more resistors are electrically connected in parallel with each other.

In addition to one or more of the features described above, or as an alternative, further embodiments may include that each of the two or more resistors has a different known resistance.

In addition to one or more of the features described above, or as an alternative, further embodiments may include that each of the two or more resistors has a known resistance such that an equal amount of voltage change is created upon elimination of one resistor from the wear indication sensor.

In addition to one or more of the features described above, or as an alternative, further embodiments may include that the component includes a second surface radially outward from a blade of the gas turbine engine and about concentric to a blade path of the blade, wherein the first electrode is oriented at about perpendicular to the second surface.

In addition to one or more of the features described above, or as an alternative, further embodiments may include that each primary conductive line electrically connects to the first electrode at a separate point, wherein each separate point is located at a different distance away from a blade of the gas turbine engine.

In addition to one or more of the features described above, or as an alternative, further embodiments may include that the component includes a second surface radially outward from a blade of the gas turbine engine and about concentric to a blade path of the blade, wherein the first electrode is oriented at an acute angle to the second surface.

In addition to one or more of the features described above, or as an alternative, further embodiments may include that each primary conductive line electrically connects to the first electrode at a separate point, wherein each separate point is located at a different distance away from a blade of the gas turbine engine.

In addition to one or more of the features described above, or as an alternative, further embodiments may include that the first electrode includes a first side and a second side opposite the first side, wherein each primary conductive line is electrically connected to the first electrode at the first side.

In addition to one or more of the features described above, or as an alternative, further embodiments may include that the first electrode includes a first side and a second side opposite the first side, wherein each primary conductive line is electrically connected to the first electrode in an alternating arrangement between the first side and the second side.

In addition to one or more of the features described above, or as an alternative, further embodiments may include that the component is an abradable coating.

In addition to one or more of the features described above, or as an alternative, further embodiments may include that the wear indication sensor is printed directly on the first surface.

In addition to one or more of the features described above, or as an alternative, further embodiments may include that the component includes a second surface that is radially outward from a blade of the gas turbine engine and about concentric to a blade path of the blade, wherein the first surface is about perpendicular to the second surface of the component.

In addition to one or more of the features described above, or as an alternative, further embodiments may include that the component includes a second surface that is radially outward from a blade of the gas turbine engine and about concentric to a blade path of the blade, wherein the first surface is at a non-perpendicular angle with respect to the second surface of the component.

In addition to one or more of the features described above, or as an alternative, further embodiments may include that the wear indication sensor is printed directly on a first side and a second side of a ramp in the first surface.

In addition to one or more of the features described above, or as an alternative, further embodiments may include In addition to one or more of the features described above, or as an alternative, further embodiments may include that the first surface and the second surface are coated with a layer of abradable coating, the abradable coating forming a third surface that is radially outward from the blade of the gas turbine engine and about concentric to the blade path of the blade.

In addition to one or more of the features described above, or as an alternative, further embodiments may include that the wear indication sensor is printed on chip that is attached to the first surface.

In addition to one or more of the features described above, or as an alternative, further embodiments may include that the component includes a second surface that is radially outward from a blade of the gas turbine engine and about concentric to a blade path of the blade, wherein the first surface is about perpendicular to the second surface of the component.

In addition to one or more of the features described above, or as an alternative, further embodiments may include that the component includes a second surface that is radially outward from a blade of the gas turbine engine and about concentric to a blade path of the blade, wherein the first surface is at a non-perpendicular angle with respect to the second surface of the component.

According to another embodiment, a method of detecting blade clearance in a gas turbine engine is provided. The method comprising: attaching a wear indication sensor to a first surface of a component of gas turbine engine opposite a blade of the gas turbine engine, wherein the wear indication sensor has two or more resistors from a first terminal to a second terminal located therein; determining a first resistance between the first terminal and the second terminal; operating the gas turbine engine at a first selected speed for a first period of time to remove one or more primary conductive lines from the wear indication sensor, wherein the one of the one or more primary conductive line connects each of the two or more resistors to the first terminal, wherein each of the one or more primary conductive lines is located at a known distance away from the blade; measuring a second resistance from the first terminal to the second terminal; determining a change in resistance between the second resistance and the first resistance; and determining an amount of material removed from the wear indication sensor by the blade in response to the change in resistance and the known depth of each of the one or more primary conductive lines.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

The detailed description explains embodiments of the present disclosure, together with advantages and features, by way of example with reference to the drawings.

DETAILED DESCRIPTION

A detailed description of one or more embodiments of the disclosed apparatus and method are presented herein by way of exemplification and not limitation with reference to the Figures.

Figure 1:
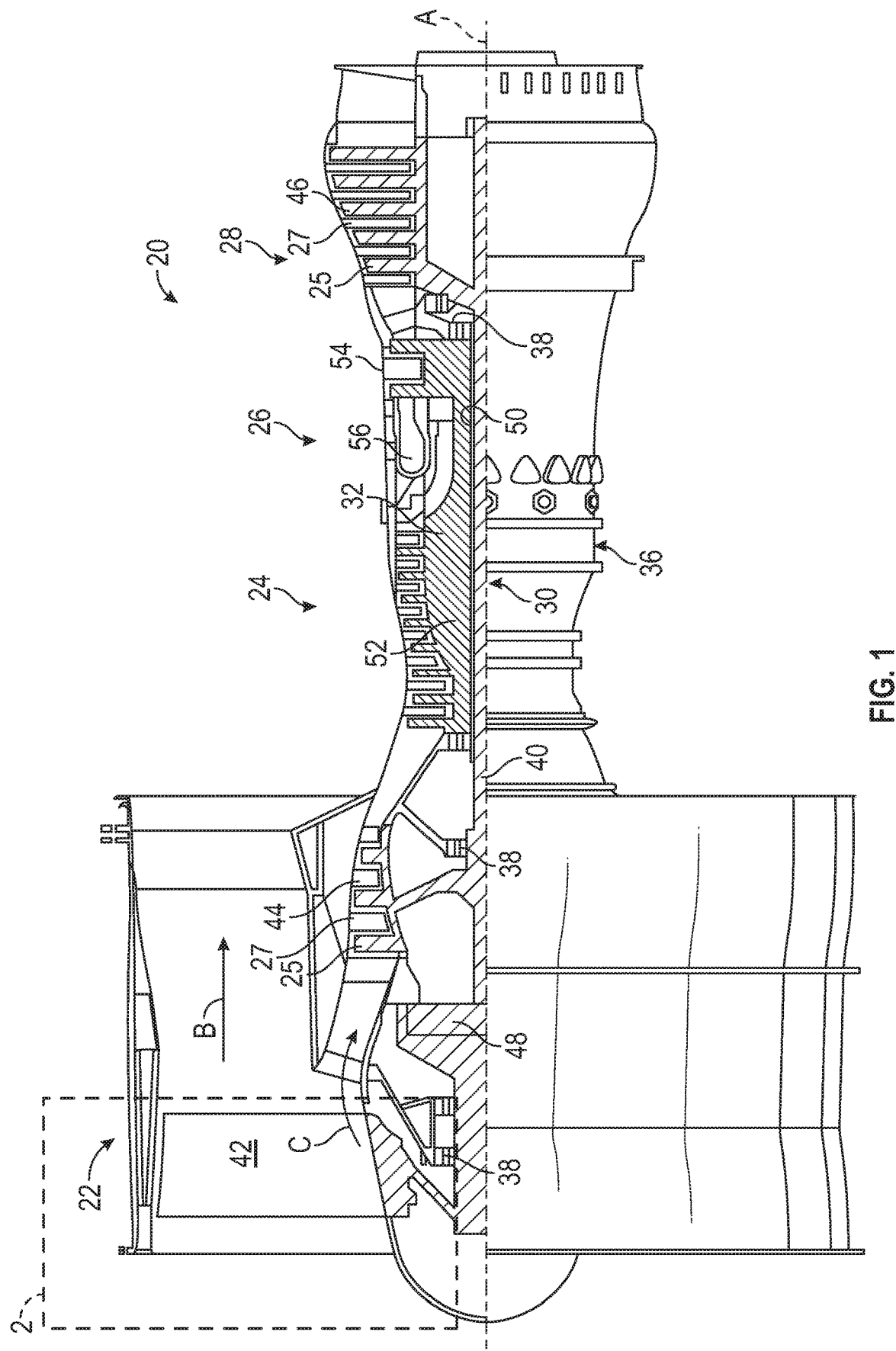
FIG. 1 is a partial cross-sectional illustration of a gas turbine engine, in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]0.5$. The "Low corrected fan tip speed" as disclosed herein according to one non-limiting embodiment is less than about 1150 ft/second (350.5 m/sec).

Figure 2:
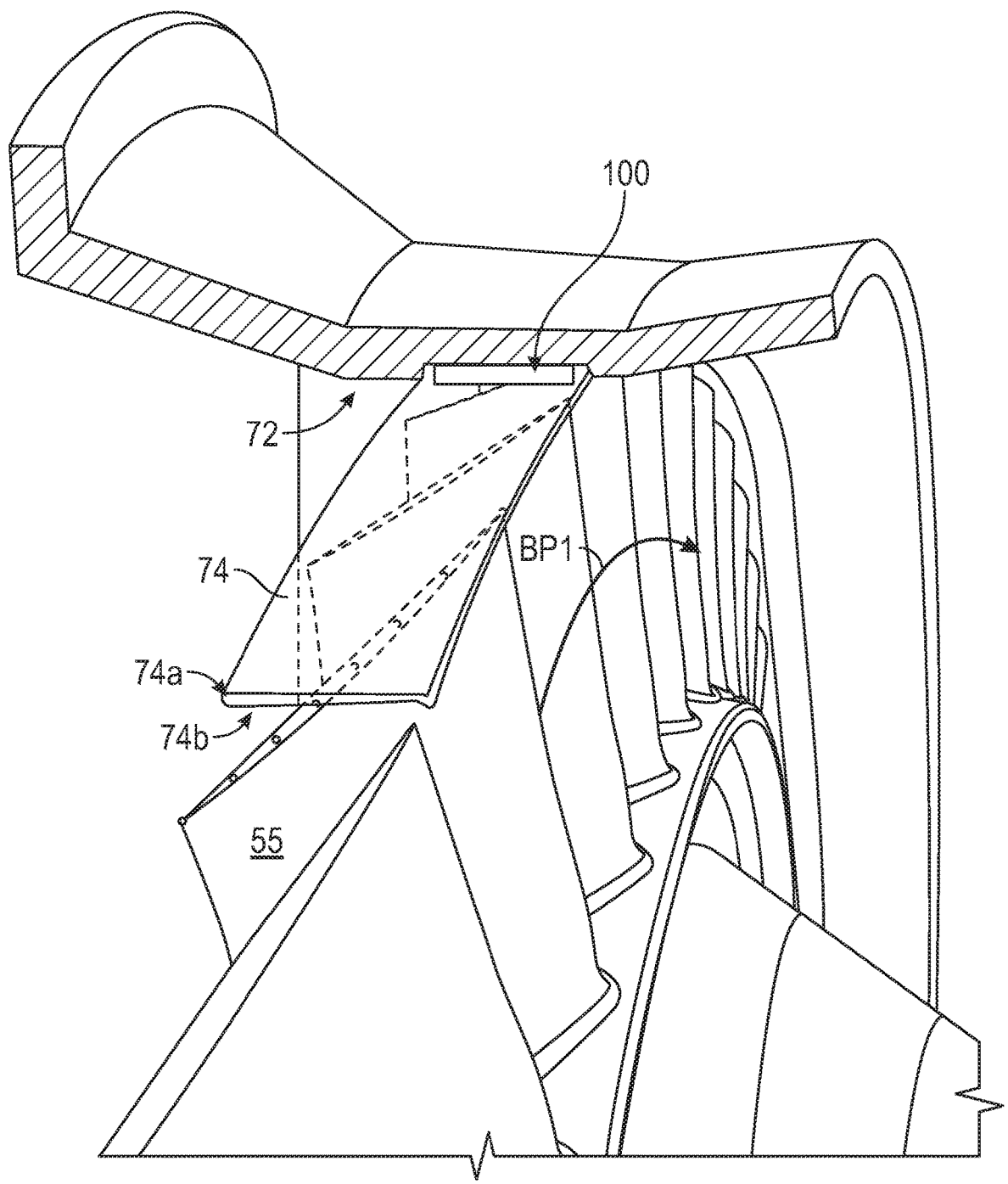
FIG. 2 is a cross-sectional illustration of a wear indication sensor attached to an inner surface of a gas turbine engine, in accordance with an embodiment of the disclosure.

Referring now to FIG. 2, which shows a cross-sectional view of a rub depth sensor or wear indication sensor 100 installed in a gas turbine engine 20, in accordance with an embodiment of the disclosure. One or more wear indication sensors 100 may be affixed to or embedded in the inner surface 72 of the gas turbine engine 20 in order to monitor the clearance between the blade 55 and the inner surface 72. As seen in FIG. 2, the wear indication sensor 100 is attached to and/or embedded in an inner surface 72 of the gas turbine engine 20 opposite a blade 55 of the gas turbine engine 20. In the embodiment of FIG. 2, the wear indication sensor 100 has been installed proximate the fan 42 of the gas turbine engine 20 but it is understood that the wear indication sensor 100 may be located in other locations including but not limited to the compressor section 24 and/or the turbine section 28 (see FIG. 1). In the illustrated embodiment, the wear indication sensor 100 is attached to or embedded in a metallic or ceramic abradable coating 74. The abradable coating 74 is designed to provide protection for the inner surface 72 against a blade 55 strike. If a blade 55 were to extend towards the inner surface 72 then the abradable coating 74 shall be struck first and absorb the impact of the blade 55 to prevent damage to the inner surface 72. The abradable coating 74 includes a first surface 74a and a second surface 74b. The wear indications sensor may be affixed to the first surface 74a of the abradable coating 74. The second surface 74b is radially outward from a blade of the gas turbine engine 20 and about concentric to a blade path BP1 of the blade 55. The wear indication sensor 100 may also be attached to or embedded in a blade outer air seal (not shown).

The wear indication sensor 100 may be attached to the inner surface 72 by being printed on the inner surface 72 through a direct writing manufacturing process, such as, for example, additive manufacturing, 3D printing, extrusion dispensing, micro dispensing, ink jet, thermal spray, laser ablation, or similar process known to one of skill in the art.

The wear indication sensor 100 may be attached to the inner surface 72 using an adhesive (not shown) that may or may not need a curing to adhere the wear indication sensor 100 to the inner surface 72. The wear indication sensor 100 may be affixed to the inner surface 72 proximate a blade monitoring probe (not shown). The blade monitoring probe may be configured to measure various performance parameters of the blade 55 including but not limited to blade timing and blade clearance. The blade monitoring probe may capture these various performance parameters wirelessly. Data captured using the wear indication sensor 100 may then later be compared to data captured by the blade monitoring probe in order to adjust the operation of the blade monitoring probe to improve the performance of the blade monitoring probe.

Figure 3:
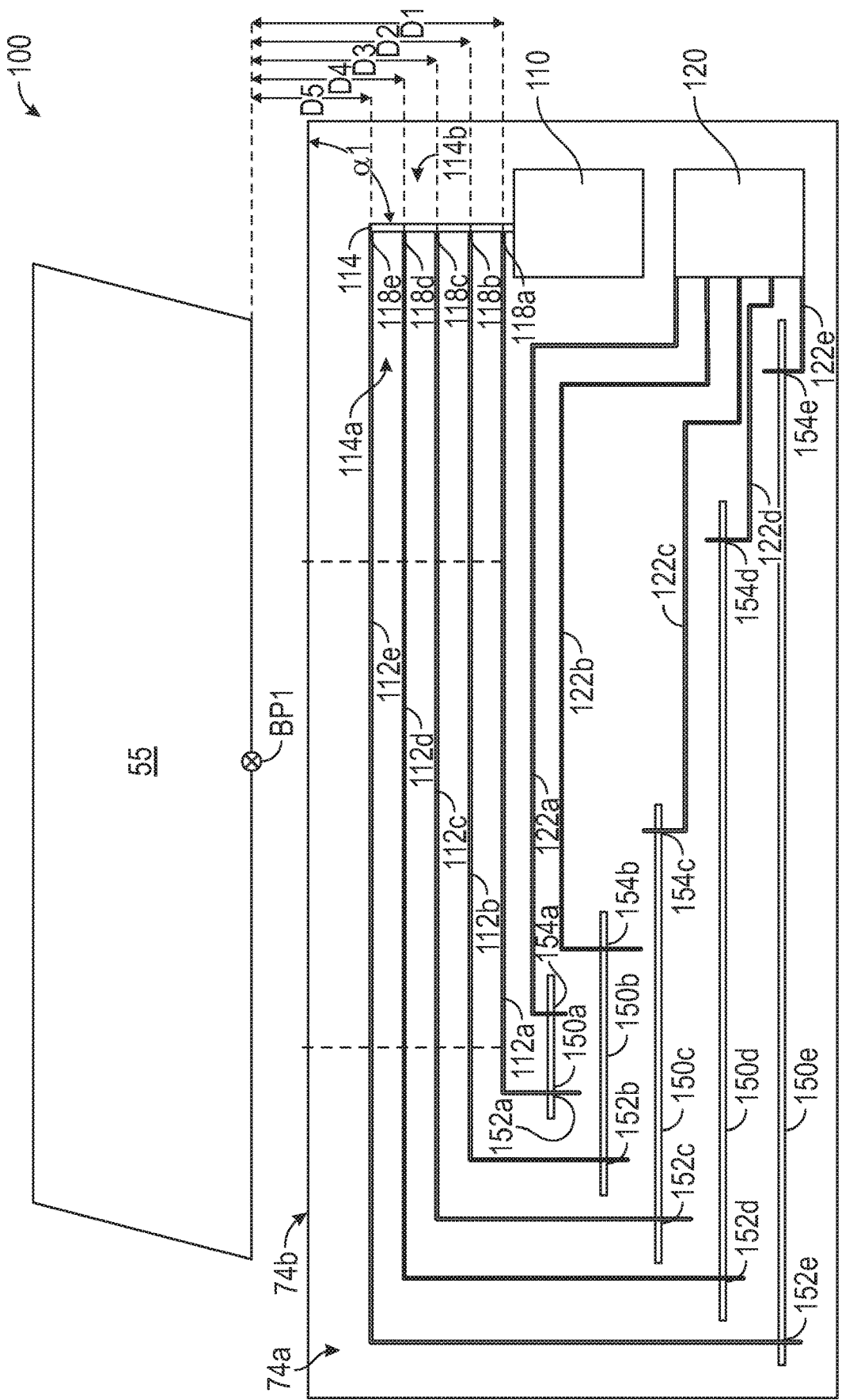
FIG. 3 is a diagram of the wear indication sensor, in accordance with an embodiment of the disclosure.
Figure 4:
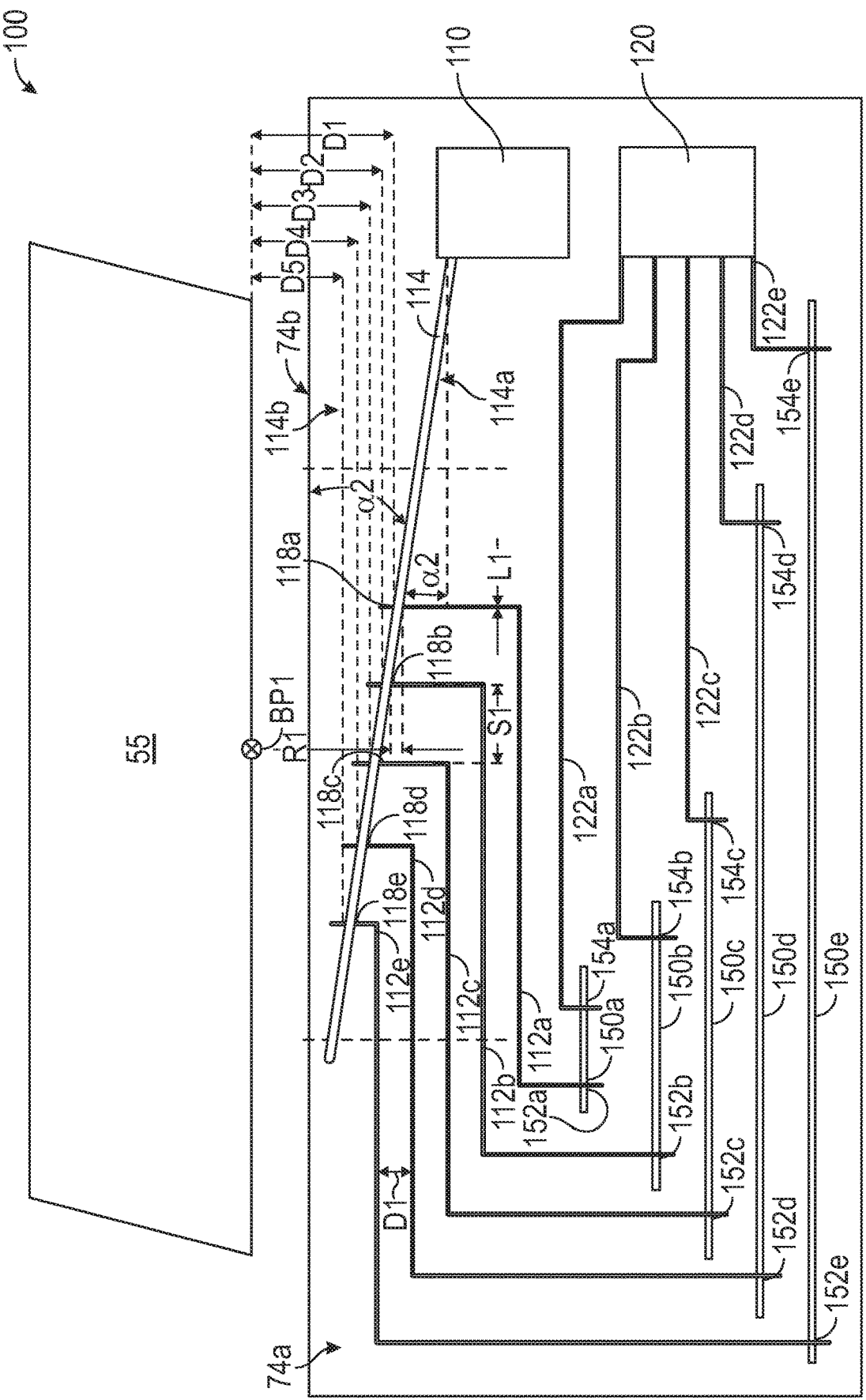
FIG. 4 is a diagram of the wear indication sensor, in accordance with an embodiment of the disclosure.
Figure 5:
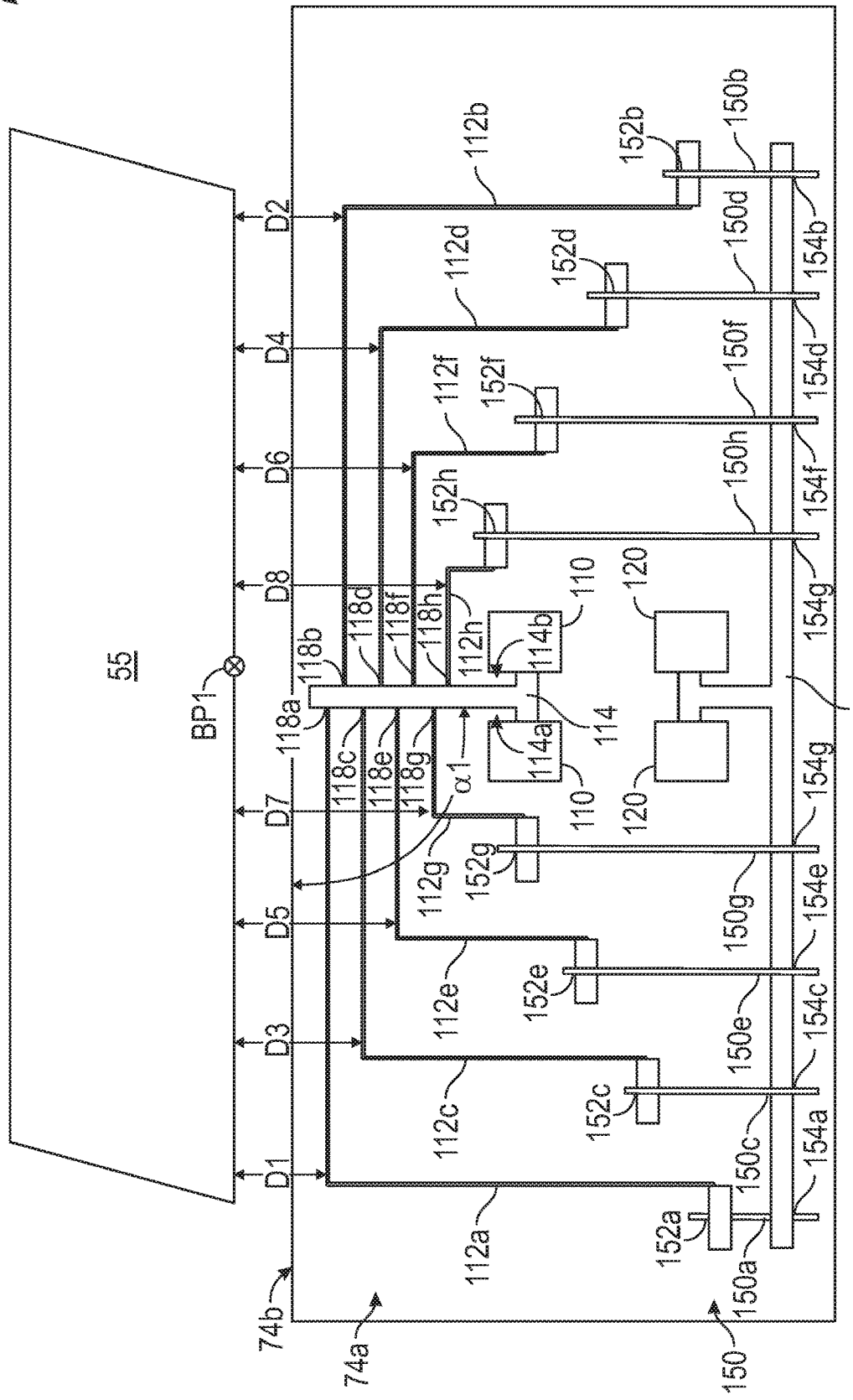
FIG. 5 is a diagram of the wear indication sensor, in accordance with an embodiment of the disclosure.

Referring now to FIGS. 3, 4, and 5, which illustrate separate configurations for a wear indication sensor 100. Referring first to FIG. 3, the wear indication sensor 100 is composed of a first terminal 110; a second terminal 120 electrically connected to the first terminal 110; and two or more of resistors 150a-150e electrically connecting the first terminal 110 to the second terminal 120. The two or more resistors 150a-150e are electrically connected in parallel with each other. Each of the two or more resistors 150a-150e includes a first end 152a-152e and a second end 154a-154e. The first ends 152a-152e are electrically connected to the first terminal 110 and the second ends 154a-154e are electrically connected to the second terminal 120. In an embodiment, each of the two or more resistors 150a-150e has a known resistance. In another embodiment, each of the two or more resistors 150a-150e has a different known resistance. In another embodiment, each resistor 150a-150e has a known resistance such that an equal amount of voltage change is created upon elimination of one resistor from the wear indication sensor 100. As seen in FIG. 3, a first electrode 114 may electrical connect the first terminal 110 to the first end 152a-152e of each of the two or more resistors 150a-150e. The first end 152a-152e of each of the two or more resistors 150a-150e is electrically connected to the first electrode 114 through primary conductive lines 112a-112e.

Each primary conductive line 112a-112e electrically connects to the first electrode 114 at a separate point 118a-118e. As seen in FIG. 3, each separate point 118-118e is located at a different distance D5-D9 away from the blade 55 of the gas turbine engine 20. The first electrode 114 includes a first side 114a and a second side 114b opposite the first side 114a. As shown in FIG. 3, each primary conductive line 112a-112e is electrically connected to the first electrode 114 at the first side 114a. The second end 154a-154e of each of the two or more resistors 150a-150e is electrically connected to the second terminal 120 through secondary conductive lines 122a-122e.

The wear indication sensor 100 may be printed on and/or attached to a component of the gas turbine engine, which is discussed later in references to FIGS. 6a-6g. In an embodiment, the component may be the abradable coating 74. The abradable coating 74 includes a first surface 74a and a second surface 74b. While the illustrated embodiment of FIG. 3 shows the wear indication sensor 100 printed directly on a first surface 74a of the abradable coating 74, the wear indication sensor 100 may also be printed on a chip 102 (See FIGS. 6c and 6d) and then attached to the first surface 74a. The second surface 74b is radially outward from a blade of the gas turbine engine 20 and about concentric to a blade path BP1 of the blade 55. The first electrode 114 may be oriented at an angle $\alpha 1$ that is about perpendicular to the second surface 74b.

Referring to FIG. 4, the wear indication sensor 100 is composed of a first terminal 110; a second terminal 120 electrically connected to the first terminal 110; and two or more of resistors 150a-150e electrically connecting the first terminal 110 to the second terminal 120. The two or more resistors 150a-150e are electrically connected in parallel with each other. Each of the two or more resistors 150a-150e include a first end 152a-152e and a second end 154a-154e. The first ends 152a-152e are electrically connected to the first terminal 110 and the second ends 154a-154e are electrically connected to the second terminal 120. In an embodiment, each of the two or more resistors 150a-150e has a known resistance. In another embodiment, each of the two or more resistors 150a-150e has a different known resistance. In another embodiment, each resistor 150a-150e has a known resistance such that an equal amount of voltage change is created upon elimination of one resistor from the wear indication sensor 100. As seen in FIG. 4, a first electrode 114 may electrical connect the first terminal 110 to the first end 152a-152e of each of the two or more resistors 150a-150e. The first end 152a-152e of each of the two or more resistors 150a-150e is electrically connected to the first electrode 114 through primary conductive lines 112a-112e.

Each primary conductive line 112a-112e electrically connects to the first electrode 114 at a separate point 118a-118e. As seen in FIG. 4, each separate point 118-118e is located at a different distance D1-D5 away from the blade 55 of the gas turbine engine 20. The first electrode 114 includes a first side 114a and a second side 114b opposite the first side 114a. As shown in FIG. 4, each primary conductive line 112a-112e is electrically connected to the first electrode 114 at the first side 114a. The second end 154a-154e of each of the two or more resistors 150a-150e is electrically connected to the second terminal 120 through secondary conductive lines 122a-122e.

The wear indication sensor 100 may be printed on and/or attached to a component of the gas turbine engine, which is discussed later in references to FIGS. 6a-6g. In an embodiment, the component may be the abradable coating 74. The abradable coating 74 includes a first surface 74a and a second surface 74b. While the illustrated embodiment of FIG. 4 shows the wear indication sensor 100 printed directly on a first surface 74a of the abradable coating 74, the wear indication sensor 100 may also be printed on a chip 102 (See FIGS. 6c and 6d) and then attached to the first surface 74a. The second surface 74b is radially outward from a blade of the gas turbine engine 20 and about concentric to a blade path BP1 of the blade 55. The first electrode 114 may be oriented at an acute angle α2 to the second surface 74b. Advantageously, the configuration shown in FIG. 4 helps to increase resolution of the wear indication sensor 100. As the acute angle α2 decreases the resolution R1 (distance between primary conductive lines 112-112e) increases. Further, the conductive line spacing S1 between primary conductive lines 112a-112e may also affect the resolution. These relationships may be expressed as an equation:

$$R1 = S1 * \tan \alpha 2$$

For example, if the conductive line spacing equals 100 microns then the resolution R1 would equal 9 microns if the acute angle α2 equals 5°, 18 microns if the acute angle α2 equals 10°, 27 microns if the acute angle α2 equals 15°, 36 microns if the acute angle α2 equals 20°, and 47 microns if the acute angle α2 equals 25°. The thickness L1 of each primary conductive line 112a-112e may also affect resolution.

Referring first to FIG. 5, the wear indication sensor 100 is composed of a first terminal 110; a second terminal 120 electrically connected to the first terminal 110; and two or more of resistors 150a-150h electrically connecting the first terminal 110 to the second terminal 120. The two or more resistors 150a-150h are electrically connected in parallel with each other. Each of the two or more resistors 150a-150h include a first end 152a-152h and a second end 154a-154h. The first ends 152a-152h are electrically connected to the first terminal 110 and the second ends 154a-154h are electrically connected to the second terminal 120. In an embodiment, each of the two or more resistors 150a-150h has a known resistance. In another embodiment, each of the two or more resistors 150a-150h has a different known resistance. In another embodiment, each resistor 150a-150e has a known resistance such that an equal amount of voltage change is created upon elimination of one resistor from the wear indication sensor 100. As seen in FIG. 5, a first electrode 114 may electrical connect the first terminal 110 to the first end 152a-152h of each of the two or more resistors 150a-150h. The first end 152a-152h of each of the two or more resistors 150a-150h is electrically connected to the first electrode 114 through primary conductive lines 112a-112h.

Each primary conductive line 112a-112h electrically connects to the first electrode 114 at a separate point 118a-118h. As seen in FIG. 5, each separate point 118-118h is located at a different distance D1-D8 away from the blade 55 of the gas turbine engine 20. The first electrode 114 includes a first side 114a and a second side 114b opposite the first side 114a. As shown in FIG. 5, each primary conductive line 112a-112h is electrically connected to the first electrode 114 in an alternating arrangement between the first side 114a and the second side 114b. Advantageously, by extending primary conductive lines 112a off of the first side 114a and the second side 114b allows for more primary conductive lines 112a-112h to be used while maintaining similar spacing being the primary conductive lines 112a-112h as was seen in FIGS. 3 and 4. The second end 154a-154h of each of the two or more resistors 150a-150h is electrically connected to the second terminal 120 through a second electrode 117.

The wear indication sensor 100 may be printed on and/or attached to a component of the gas turbine engine, which is discussed later in references to FIGS. 6a-6g. In an embodiment, the component may be the abradable coating 74. The abradable coating 74 includes a first surface 74a and a second surface 74b. While the illustrated embodiment of FIG. 5 shows the wear indication sensor 100 printed directly on a first surface 74a of the abradable coating 74, the wear indication sensor 100 may also be printed on a chip 102 (See FIGS. 6c and 6d) and then attached to the first surface 74a. The second surface 74b is radially outward from a blade of the gas turbine engine 20 and about concentric to a blade path BP1 of the blade 55. The first electrode 114 may be oriented at an angle α1 that is about perpendicular to the second surface 74b.

Referring now to FIGS. 6a-6g, which show different methods that the wear indication sensor 100 is secured to a first surface 72a of the component of the gas turbine engine. FIGS. 6a-6g show a second surface that is radially outward from a blade of the gas turbine engine and about concentric to a blade path of the blade. In the embodiments of FIGS. 6a-6g the component is the abradable coating 72.

Figure 6A:
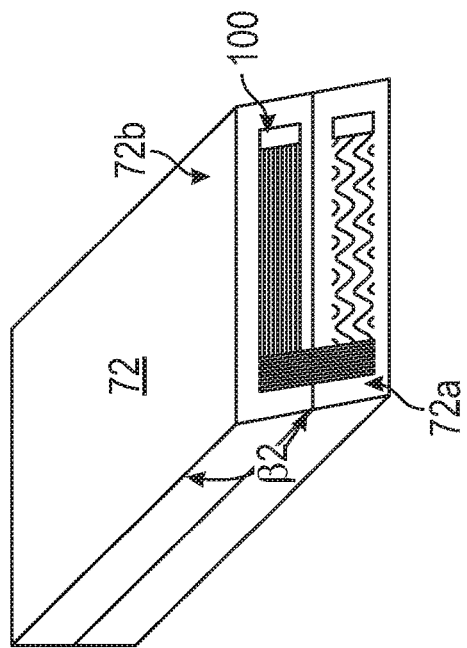
FIG. 6a-6g is a perspective of where the indication sensor may be attached to a component of the gas turbine engine, in accordance with an embodiment of the disclosure.
Figure 6B:
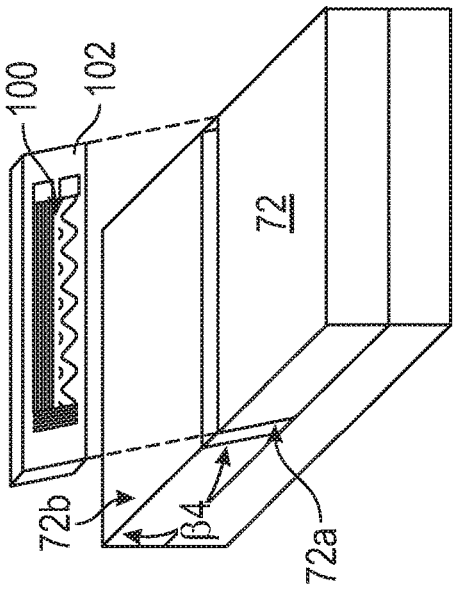

FIGS. 6a and 6b show that the wear indication sensor 100 may be printed directly on the first surface 72a. As seen in FIG. 6a, the first surface 72a may be about perpendicular to the second surface 72b of the component (abradable coating 72), thus β1 is equal to about 90 degrees. As seen in FIG. 6b, the first surface may be at a non-perpendicular angle with respect to the second surface 72b of the component (abradable coating 72), thus β2 is not equal to about 90 degrees. Advantageously, the first surface 72a being at a non-perpendicular angle with respect to the second surface 72b allows for a higher resolution by increasing the primary conductive lines for a particular thickness of the component (abradable coating 72).

Figure 6C:
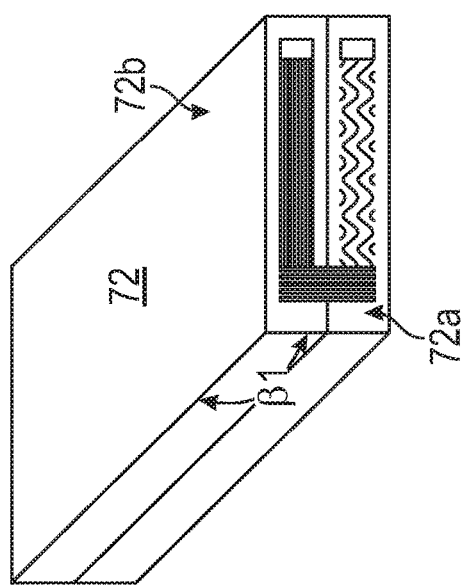
Figure 6D:
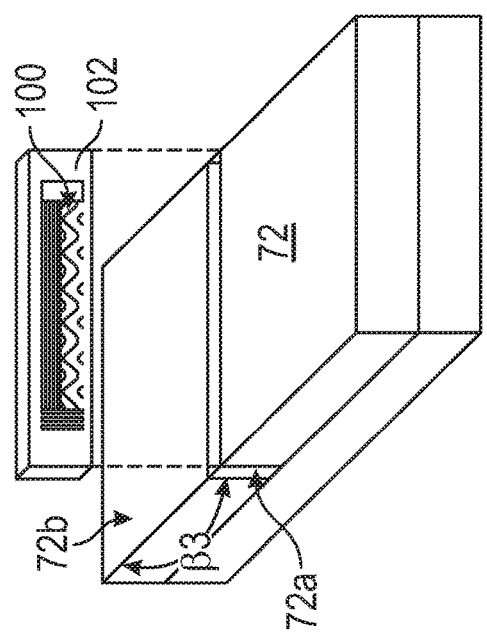

FIGS. 6c and 6d show that the wear indication sensor 100 may be printed on chip 102 that is attached to the first surface 72a. As seen in FIG. 6c, the first surface 72a may be about perpendicular to the second surface 72b of the component (abradable coating 72), thus β3 is equal to about 90 degrees. As seen in FIG. 6d, the first surface 72a may be at a non-perpendicular angle with respect to the second surface 72b of the component (abradable coating 72), thus β4 is not equal to about 90 degrees. Advantageously, the first surface 72a being at a non-perpendicular angle with respect to the second surface 72b allows for a higher resolution by increasing the primary conductive lines for a particular thickness of the component (abradable coating 72).

Figure 6G:
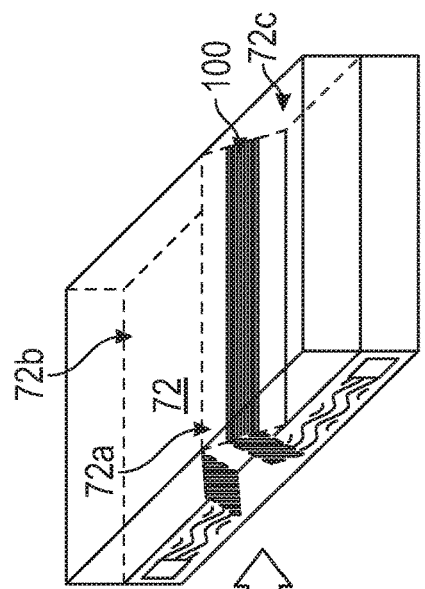
Figure 6F:
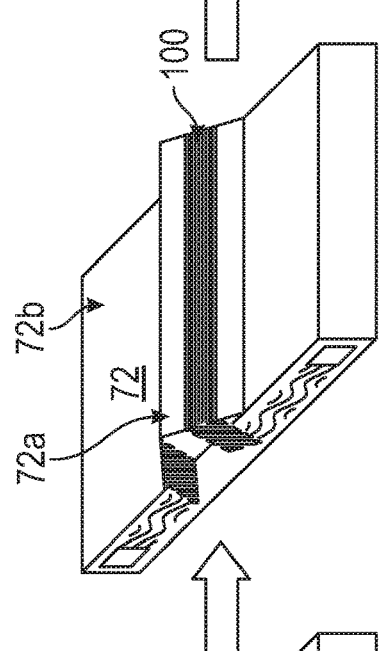
Figure 6E:
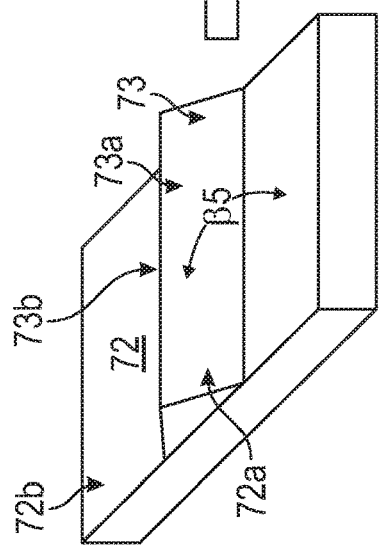

FIGS. 6e-6g show that the wear indication sensor 100 may be printed on a first surface 72a on a ramp 73 of the component (abradable coating 72). A wear indication sensor 100 may be printed on a first side 73a of the ramp 73 and a second side 73b of the ramp 73. Advantageously, by printing on two sides 73a, 73b of the ramp 73, the two wear indication sensors 100 in FIGS. 6f and 6g will have twice the resolution. The first surface 72a may be at a non-perpendicular angle β5 with the second surface 72b. As shown in FIG. 6g, the first surface 72a and the second surface 72b may be coated with a layer 72c of abradable coating 72.

Figure 7:
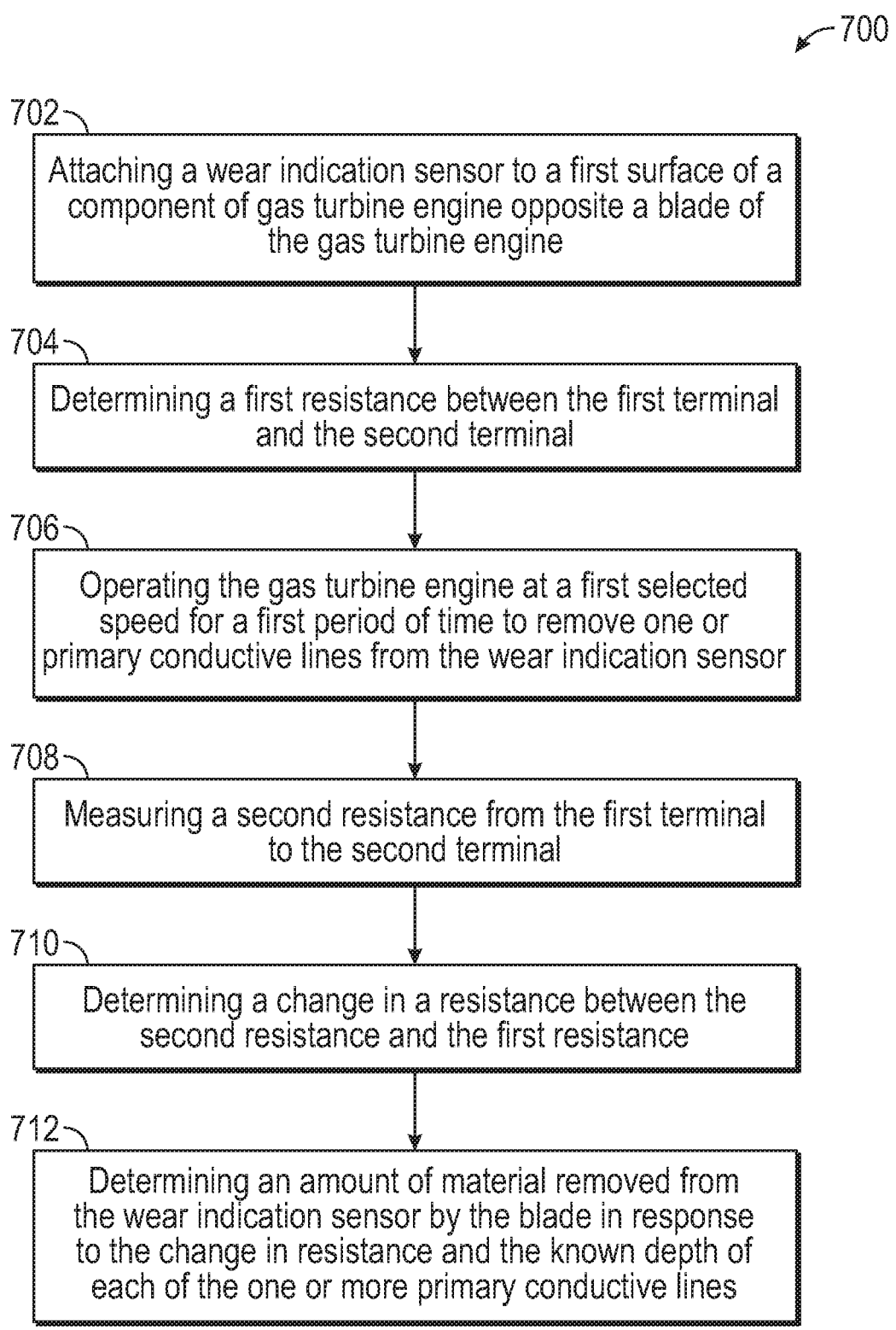
FIG. 7 is a flow chart illustrating a method of detecting blade clearance within a gas turbine engine, in accordance with an embodiment of the disclosure.

Referring now to FIG. 7 with continued reference to FIGS. 1-4. FIG. 7 is a flow chart illustrating a method 700 for detecting blade clearance in a gas turbine engine 20, in accordance with an embodiment. At block 702, attaching a wear indication sensor 100 to a first surface 72a of a component (abradable coating 72) of gas turbine engine 20 opposite a blade 55 of the gas turbine engine 20. The wear indication sensor 100 has two or more resistors 150a-150e electrically from a first terminal 110 to a second terminal 120 located therein. The two or more resistors 150-150e may be electrically connected in parallel. At block 704, a first resistance is determined between the first terminal 110 and the second terminal 120. The first resistance may be calculated due to the resistance of each resistor 150a-150e being known. Alternatively, the first resistance may be measured.

At block 706, the gas turbine engine 250 is operated at a first selected speed for a first period of time to remove one or more primary conductive lines 112a-112e from the wear indication sensor 100. The one of the one or more primary conductive line 112a-112e connects each of the two or more resistors 150a-150e to the first terminal 110. Each of the one or more primary conductive lines 112a-112e is located at a known distance D1-D5 away from the blade 55. At block 708, a second resistance from the first terminal 110 to the second terminal 120 is measured. At block 710, a change in resistance between the second resistance and the first resistance is determined. At block 712, an amount of material removed from the wear indication sensor 100 by the blade 55 is determined in response to the change in resistance and the known depth D1-D5 of each of the one or more primary conductive lines 112a-112e.

While the above description has described the flow process of FIG. 7 in a particular order, it should be appreciated that unless otherwise specifically required in the attached claims that the ordering of the steps may be varied.

Technical effects of embodiments of the present disclosure include using a wear indication sensor to determine blade tip clearance through detecting a change in electrical resistance.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. In combination a wear indication sensor and a component of a gas turbine engine, wherein the wear indication sensor is secured to a first surface of the component of the gas turbine engine, the wear indication sensor comprising:
   a first terminal;
   a second terminal electrically connected to the first terminal;
   two or more of resistors electrically connecting the first terminal to the second terminal, each of the two or more resistors including a first end electrically connected to the first terminal and a second end electrically connected to the second terminal, wherein each of the two or more resistors has a known resistance; and
   a first electrode electrically connecting the first terminal to the first end of each of the two or more resistors;
   wherein the first end of each of the two or more resistors is electrically connected to the first electrode through primary conductive lines,
   wherein the component includes a second surface radially outward from a blade of the gas turbine engine and about concentric to a blade path of the blade, and
   wherein the first surface is at a non-perpendicular angle with respect to the second surface.

2. The combination of the wear indication sensor and the component of the gas turbine engine of claim 1, wherein the two or more resistors are electrically connected in parallel with each other.

3. The combination of the wear indication sensor and the component of the gas turbine engine of claim 1, wherein each of the two or more resistors has a different known resistance.

4. The combination of the wear indication sensor and the component of the gas turbine engine of claim 1, wherein each of the two or more resistors has a known resistance such that an equal amount of voltage change is created upon elimination of one resistor from the wear indication sensor.

5. The combination of the wear indication sensor and the component of the gas turbine engine of claim 1, wherein each primary conductive line electrically connects to the first electrode at a separate point, wherein each separate point is located at a different distance away from a blade of the gas turbine engine.

6. The combination of the wear indication sensor and the component of the gas turbine engine of claim 1, wherein the first electrode is oriented at an acute angle to the second surface.

7. The combination of the wear indication sensor and the component of the gas turbine engine of claim 6, wherein each primary conductive line electrically connects to the first electrode at a separate point, wherein each separate point is located at a different distance away from a blade of the gas turbine engine.

8. The combination of the wear indication sensor and the component of the gas turbine engine of claim 1, wherein the first electrode includes a first side and a second side opposite the first side, wherein each primary conductive line is electrically connected to the first electrode at the first side.

9. The combination of the wear indication sensor and the component of the gas turbine engine of claim 1, wherein the first electrode includes a first side and a second side opposite the first side, wherein each primary conductive line is electrically connected to the first electrode in an alternating arrangement between the first side and the second side.

10. The combination of the wear indication sensor and the component of the gas turbine engine of claim 1, wherein the wear indication sensor is printed directly on the first surface.

11. The combination of the wear indication sensor and the component of the gas turbine engine of claim 10, wherein the component is an abradable coating.

12. The combination of the wear indication sensor and the component of the gas turbine engine of claim 10, wherein the wear indication sensor is printed directly on a first side and a second side of a ramp in the first surface.

13. The combination of the wear indication sensor and the component of the gas turbine engine of claim 12, wherein the first surface and the second surface are coated with a layer of abradable coating, the abradable coating forming a third surface that is radially outward from the blade of the gas turbine engine and about concentric to the blade path of the blade.

14. The combination of the wear indication sensor and the component of the gas turbine engine of claim 1, wherein the wear indication sensor is printed on chip that is attached to the first surface.

15. The combination of the wear indication sensor and the component of the gas turbine engine of claim 14, wherein the component includes a second surface that is radially outward from a blade of the gas turbine engine and about concentric to a blade path of the blade, wherein the first surface is about perpendicular to the second surface of the component.

16. The combination of the wear indication sensor and the component of the gas turbine engine of claim 14, wherein the component includes a second surface that is radially outward from a blade of the gas turbine engine and about concentric to a blade path of the blade, wherein the first surface is at a non-perpendicular angle with respect to the second surface of the component.

17. A method of detecting blade clearance in a gas turbine engine, the method comprising:
  attaching a wear indication sensor to a first surface of a component of gas turbine engine opposite a blade of the gas turbine engine, wherein the wear indication sensor has two or more resistors from a first terminal to a second terminal located therein,
  wherein the component includes a second surface radially outward from a blade of the gas turbine engine and about concentric to a blade path of the blade, and wherein the first surface is at a non-perpendicular angle with respect to the second surface;
  determining a first resistance between the first terminal and the second terminal;
  operating the gas turbine engine at a first selected speed for a first period of time to remove one or more primary conductive lines from the wear indication sensor, wherein the one of the one or more primary conductive line connects each of the two or more resistors to the first terminal, wherein each of the one or more primary conductive lines is located at a known distance away from the blade;
  measuring a second resistance from the first terminal to the second terminal;
  determining a change in resistance between the second resistance and the first resistance; and
  determining an amount of material removed from the wear indication sensor by the blade in response to the change in resistance and the known depth of each of the one or more primary conductive lines.

* * * * *